L. BORDWELL.
MIXER.
APPLICATION FILED MAR. 11, 1914.
1,171,922.
Patented Feb. 15, 1916.
2 SHEETS—SHEET 1.
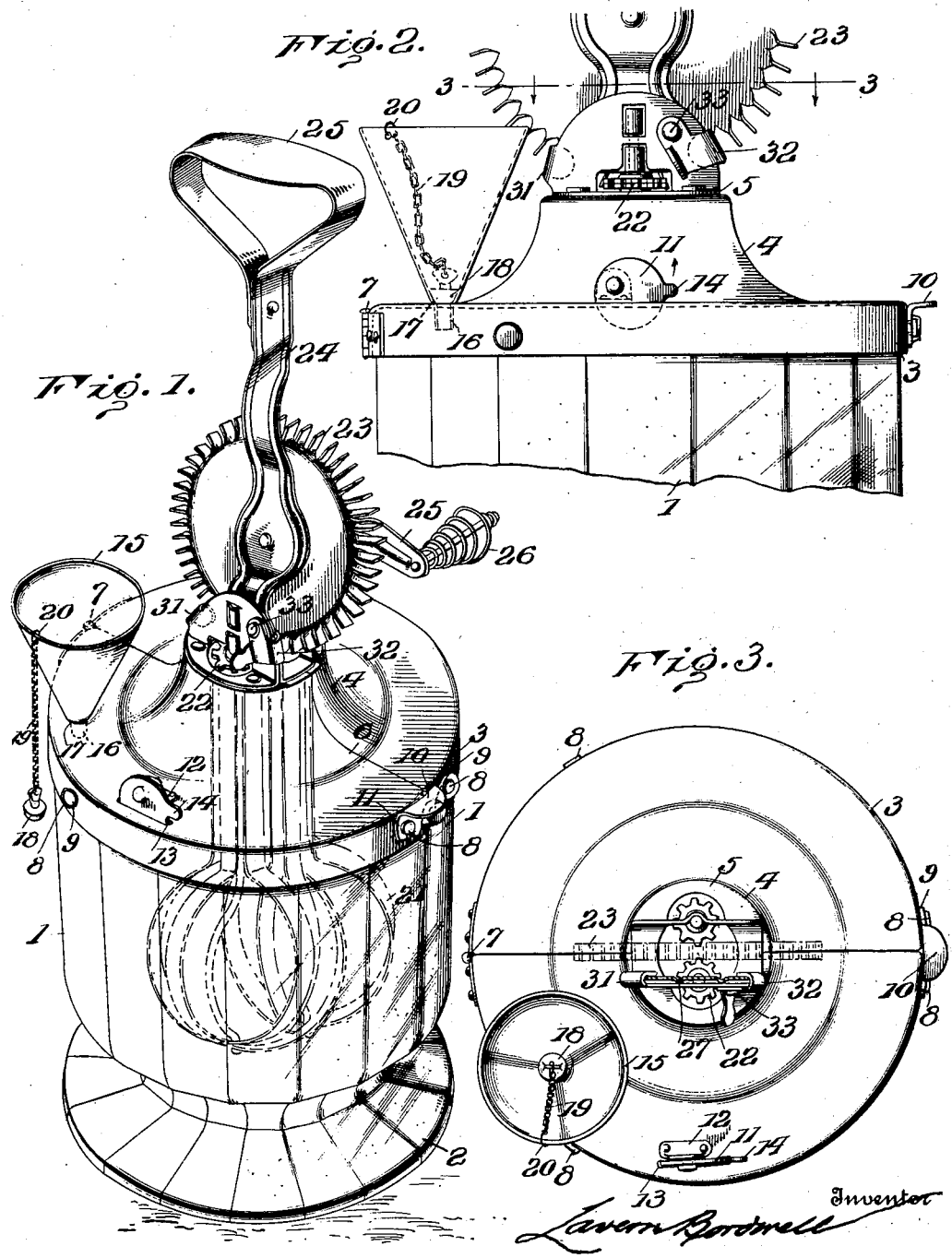
Witnesses
W. A. Williams
L. L. Burket
Inventor
Lavern Bordwell

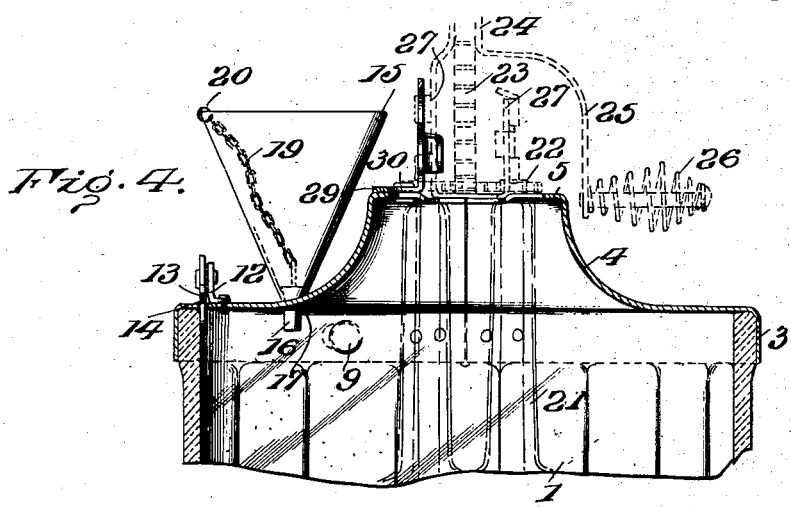

UNITED STATES PATENT OFFICE.

LAVERN BORDWELL, OF NEW YORK, N. Y.

MIXER.

1,171,922.  Specification of Letters Patent.  Patented Feb. 15, 1916.

Application filed March 11, 1914. Serial No. 823,918.

*To all whom it may concern:*

Be it known that I, LAVERN BORDWELL, a citizen of the United States, residing at 1133 Broadway, New York city, in the county of New York and State of New York, have invented certain new and useful Improvements in Mixers, of which the following is a specification, reference being had therein to the accompanying drawing.

My invention relates to improvements in mixers, the primary object of which is to construct a mixer which consists of a receptacle within which a beater may be placed when it is desired to use the combined receptacle and beater as a mixer, or the beater may be readily withdrawn from the receptacle when it is desired to use the beater alone. The receptacle here shown and described is especially adapted to be used with a beater such as is fully described in the Ladd patent, dated July 7th, 1908, No. 892,856.

Another object of the present invention is to construct a mixer which comprises a receptacle having a divided top, whereby the beater may be easily and quickly placed within and taken out of the receptacle.

A further object of the present improvement is to so construct the top of the receptacle that the beater may be placed therein and taken out thereof by one movement.

A still further object of my present improvement is to provide a mixer which comprises a receptacle and top so constructed that it may be used in conjunction with a beater, or the top may be taken therefrom and the receptacle used for other purposes.

A still further object of the present improvement is to provide a beater having an oil feeding device which may be regulated to suit the desires of the users.

In the accompanying drawings—Figure 1 is a perspective view of my improved mixer, showing the receptacle with its cover carrying beater and the oil feeding device. Fig. 2 is an enlarged side elevation showing the construction of the attaching means for the beater in detail. Fig. 3 is a top plan view of my improved mixer, showing the beater partly broken away. Fig. 4 is a sectional view of the mixer, showing the attaching means for holding the cover to the receptacle and also for holding the beater, the beater partly broken away and partly shown in dotted lines. Fig. 5 is a perspective view of the receptacle and the cover attached thereto and showing in detail both the means of withdrawing and inserting the beater and also for holding the cover to the receptacle. Fig. 6 is a fragmentary detailed view of the clamping means carried by the receptacle for supporting and holding the beater.

Referring now to the drawings, in which like reference numerals designate similar parts, 1 represents a receptacle which is here shown constructed of glass and having an outwardly flared base 2, but it is readily understood that the construction of the receptacle or the material of which it is composed, may be changed without departing from the spirit and scope of the present improvement.

The upper end of the receptacle 1, carries a cover which comprises a flange 3, which is adapted to fit around the top of the receptacle 1 and a reduced upwardly extending portion 4, which terminates in a circular flattened portion 5. The cover is bisected, as shown at 6, and the two portions formed by this bisection are connected by any desired form of hinge 7. The object and purpose of having this cover formed in two parts will be hereinafter fully pointed out.

The means for attaching the cover to the receptacle, comprises lugs 8, which are molded on the upper portion of the receptacle 1 and which pass through openings 9 formed in the flange 3 of the cover. In order to keep the two portions of the cover closed when it is so desired, a catch 10 is provided having a portion 10′, which passes over one of the lugs, above referred to. In order to insure that the cover will not slide from the receptacle when one-half thereof is swung out, as shown in Fig. 5, a locking member is provided which consists of an eccentrically arranged disk 11, pivoted upon a bracket 12, which is secured to the cover. When it is desired to lock the cover to the receptacle, this disk is turned downwardly through an opening 13, formed in the cover by means of a thumb knob 14, as will be readily understood. When the disk 11 is in its downward position, it engages the inner side of the receptacle, as is clearly shown in Fig. 4, and it is not possible to move this section of the cover thus attached from the receptacle.

The oil feeding mechanism comprises a funnel 15, the spout 16 of which passes through an opening 17 formed in the receptacle cover. This oil feeding mechanism is carried by the half of the cover which remains stationary. In order to both regulate or stop the passage of oil through the funnel, a removable plug 18 is provided which is carried by a chain 19 attached to the upper end of the funnel at a point 20. This plug 18 is of a size and is adapted to close the opening at the bottom of the funnel, when it is so desired. The plug is shown closing this opening in Figs. 2, 3 and 4.

The means for attaching the beater within the receptacle is carried by the flattened portion 5 of the cover. The beater here used in conjunction with this cover is of the form known as the Ladd beater, which comprises beater blades 21, which are operated by gears 22, which mesh with a manually turned gear 23, carried by the upright 24 of the handle 25. The operating means of the gear 23 comprises a crank 25 to which is attached a knob 26. The specific form of beater will not be referred to here, as it has been fully described in said Ladd patent. The only parts which will be especially referred to in this application are the flanges 27, which carry the parallel arranged gears 22. A flange of relatively the same size and shape as one of the flanges 27 of the beater is attached to the portion 5 of the cover. This flange referred to is numbered 28 and is connected to the portion 5 by means of a laterally extended portion 29 and bolts 30, which pass therethrough clamping it to the portion 5. A lip 31 is formed of one edge of the flange 28 and a catch 32 is pivotally mounted at 33 on the other edge of the flange 28. The catch and lip are of a thickness to embrace the edge of the flange 27 of the beater, as will be readily understood, to clamp the flange 27 to the flange 28. Fig. 6 shows in detail how these two flanges are clamped together. Openings 34 are formed in the flanges 28 to admit the bearings 35 for the axles of the gears 22.

From the foregoing description and by reference to the Ladd patent, it will be seen that the attaching means here provided necessitates absolutely no change in the construction of the beater. However, it is to be understood that the specific form here shown is but one means of accomplishing an attaching means which is carried by the cover of a receptacle.

It is to be understood that the device here shown is intended to cover any mixing device which has a cover removable therefrom and which cover is adapted to carry a beater, the beater adapted to be attachable and detachable from the cover. This construction provides a mixing device which may be used as a mixer, the beater of which may be taken from the device and used alone as a beater for any desired purpose.

Having thus described my invention, what I claim and desire to secure by Letters Patent is:

1. A mixer comprising a receptacle, a hinged cover therefor, and a unitary beater mechanism separate from the cover comprising a framework, beater blades carried thereby; actuating means for the said blades and a handle; the framework of the said beater mechanism and one section of the cover having an interlocking connection, said connection and cover providing means whereby the beater may be removed from the cover and removed from the receptacle when a portion of the cover has been swung outwardly.

2. A mixer comprising a receptacle, a hinged cover therefor, the cover and receptacle having interlocking connections; and a unitary beater mechanism separate from the cover comprising a framework, beater blades carried thereby, actuating means for the said blades, and a handle; said framework and one portion of the cover having an interlocking connection, said connection and cover providing means whereby the beater may be removed from the cover and removed from the receptacle when a portion of the hinged cover has been swung outwardly.

3. A mixer comprising a receptacle, a hinged cover therefor, the cover and receptacle having interlocking connections, whereby the cover may be fastened or removed from the receptacle; and a unitary beater mechanism separate from the cover comprising a framework, beater-blades carried thereby, actuating means for the said blades, and a handle; said framework and one portion of the cover having an interlocking connection, said connection and cover providing means whereby the beater may be removed from the cover and removed from the receptacle when a portion of the cover has been swung outwardly.

4. A mixer comprising a receptacle, a cover therefor, said cover having a depending flange, interlocking connections between the flange and the receptacle, whereby the cover is removably carried by the receptacle, said cover comprising two hinged portions; and a unitary beater mechanism separate from the cover comprising a framework, beater-blades carried thereby, actuating means for the said blades, and a handle; an interlocking connection between the beater framework and one section of the cover, whereby the beater may be removed from the receptacle and the cover when a section of the cover is swung away from the receptacle.

5. A mixer comprising a receptacle, a hinged cover, interlocking connections between the cover and the receptacle whereby the cover is removably carried thereby, a catch for holding the said sections of the cover together, and a unitary beater mechanism separate from the cover comprising a framework, beater blades carried thereby, actuating means for the said blades and the handle; an interlocking connection between the beater-blade framework and one section of the cover, whereby the beater may be removed from the receptacle and the cover when a section of the cover is swung away from the receptacle.

6. A mixer comprising a receptacle, a cover therefor, said cover comprising two hinged portions, means for holding one of the hinged portions on the receptacle when the other portion is swung away therefrom, a catch for holding the hinged portions together; and a unitary beater mechanism separate from the cover comprising a framework, beater blades carried thereby, actuating means for the said blades and the handle; an interlocking connection between the beater framework, and the hinged portion of the cover, whereby the beater may be removed from the receptacle and the cover, when a section of the cover is swung away from the receptacle.

7. A mixer comprising a receptacle, a cover therefor, said cover comprising two hinged portions; and a unitary beater mechanism separate from the cover comprising a framework, beater blades carried thereby, actuating means for the said blades, and a handle; a portion of the beater framework between the beater blades and the handle having an interlocking connection with one of the hinged portions of the cover, whereby the beater blades extend within the receptacle, and the handle extends without the receptacle, and whereby the beater may be removed from the cover and removed from the receptacle when a portion of the cover has been swung outwardly.

8. A mixer comprising a receptacle, a cover therefor, said cover comprising two hinged sections, means for holding the cover on the receptacle; and a unitary beater mechanism separate from the cover comprising a framework, beater-blades carried thereby, actuating means for the said blades, and a handle; an interlocking connection between the beater framework and one section of the cover, the said connection comprising a flange carried by the beater framework between the beater-blades and the handle, a flange on one section of the cover adjacent the flange on the beater, and means for connecting the said flanges, said interlocking connection and cover providing means whereby the beater may be removed from the cover and from the receptacle when a portion of the cover has been swung outwardly.

9. A mixer comprising a receptacle having lugs on its upper edge, a cover having a depending flange, the said flange having openings fitting over the lugs on the receptacle, said cover comprising two hinged portions; and a unitary beater mechanism separate from the cover comprising a framework, beater blades carried thereby, actuating means for the said blades, and a handle; an interlocking connection between the beater framework and one section of the cover, whereby the beater may be removed from the receptacle and the cover when a section of the cover is swung away from the receptacle.

10. A mixer comprising a receptacle, a cover therefor, said cover comprising two hinged sections, means for holding the cover on the receptacle; a unitary beater mechanism separate from the cover comprising a framework, beater blades carried thereby, actuating means for the said blades, and a handle; an interlocking connection between the beater framewrok and one section of the cover, said interlocking connection comprising a vertical flange carried by the beater framework between the beater-blades and the handle, a vertical flange on the cover adjacent the flange on the beater, friction means for connecting the said flanges, said connecting means carried by the flange on the cover, said interlocking connection providing means, whereby the beater may be removed from the cover and removed from the receptacle when a portion of the cover has been swung outwardly.

11. A mixer comprising a receptacle, a cover therefor, said cover comprising two hinged sections, means for holding one of the hinged sections on the receptacle when the other portion is swung away therefrom, a catch for holding the said hinged portions together; and a unitary beater mechanism separate from the cover comprising a framework, beater blades carried thereby, actuating means for the said blades, and a handle; an interlocking connection between the beater framework and the hinged portion of the cover, said interlocking connection comprising a vertical flange carried by the framework between the beater-blades and the handle, a vertical flange on the stationary section of the cover adjacent the flange on the beater, friction means for connecting the flanges, the said connecting means carried by the flange on the cover, the said interlocking connection and cover providing means whereby the beater may be removed from the cover and from the receptacle when one section of the cover has been swung outwardly.

12. A mixer comprising a receptacle, a cover therefor, a beater within the receptacle and extending upwardly through the cover, a flange on the beater, a flange carried by the cover adjacent the flange on the beater, the flange on the cover having a lip and a pivoted catch forming a connecting means between the two flanges, the parts arranged as and for the purpose described.

13. A mixer comprising a receptacle, a cover and receptacle having interlocking connections, the cover comprising two hinged portions, a catch for holding the two sections together, means for holding one of the portions on the receptacle when the other portion is swung outwardly, an oil feeding mechanism carried by the rigid portion of the cover, and a unitary beater mechanism separate from the cover comprising a framework, beater blades carried thereby, actuating means for the said blades, and a handle; an interlocking connection between the beater framework and the rigid portion of the cover, said connection on the beater framework being between the beater blades and handle, whereby the beater blades extend within the receptacle and the handle extends without the receptacle, the interlocking connection and cover providing means whereby the beater mechansim may be removed from the cover and from the receptacle when a portion of the cover has been swung outwardly.

14. A mixer comprising a receptacle, said receptacle having lugs on the upper edge thereof, a cover therefor, said cover having a flange having openings registering with the lugs on the receptacle, a cover comprising two hinged portions, means for holding one of the portions of the cover on the receptacle when the other portion is swung outwardly, a catch for holding the said hinged portions together, an oil feeding mechanism carried by the rigid section of the cover; and a unitary beater mechanism separated from the cover comprising a framework, beater blades carried thereby, actuating means for the said blades, and a handle; an interlocking connection between the beater framework and the rigid section of the cover, said connection with the framework between the beater blades, and the handle, whereby the beater blades extend within the receptacle and the handle extends without the receptacle, the interlocking connection and cover providing means whereby the beater mechanism may be removed from the cover and from the receptacle when a portion of the cover has been swung outwardly.

In testimony whereof I hereunto affix my signature in the presence of two witnesses.

LAVERN BORDWELL.

Witnesses:
O. F. BISHOP,
B. LEVEY.